United States Patent
Song et al.

(10) Patent No.: US 9,100,979 B2
(45) Date of Patent: Aug. 4, 2015

(54) HIDDEN NODE INTERFERENCE ISSUE IN A TYPE II RELAY NETWORK

(75) Inventors: Yi Song, Plano, TX (US); Yi Yu, Irving, TX (US); Chandra S. Bontu, Nepean (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/639,042

(22) PCT Filed: Aug. 2, 2011

(86) PCT No.: PCT/US2011/046223
§ 371 (c)(1),
(2), (4) Date: Oct. 2, 2012

(87) PCT Pub. No.: WO2013/019215
PCT Pub. Date: Feb. 7, 2013

(65) Prior Publication Data
US 2014/0169279 A1    Jun. 19, 2014

(51) Int. Cl.
*H04W 72/12* (2009.01)
*H04W 72/08* (2009.01)
*H04W 84/04* (2009.01)

(52) U.S. Cl.
CPC ........ *H04W 72/1231* (2013.01); *H04W 72/082* (2013.01); *H04W 84/047* (2013.01)

(58) Field of Classification Search
CPC .................. H04W 72/1231; H04W 72/082
USPC .......... 370/252, 310, 328, 329, 330; 455/450, 455/452.1, 510
See application file for complete search history.

(56) References Cited

U.S. PATENT DOCUMENTS

| | | | |
|---|---|---|---|
| 8,275,390 B1 * | 9/2012 | Muqattash et al. | ........... 455/455 |
| 2008/0260000 A1 | 10/2008 | Periyalwar et al. | |
| 2009/0191882 A1 * | 7/2009 | Kovacs et al. | ................. 455/450 |
| 2011/0292898 A1 * | 12/2011 | Wu et al. | ....................... 370/329 |

FOREIGN PATENT DOCUMENTS

WO      2006034578      4/2006

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description, Stage 2 (release 10); 3GPP Standard; Mobile Competence Centre; p. 1-197; Apr. 5, 2005.
Alcatel-Lucent, et al.; "System Design Frameworks to Support Type II Relay Operation in LTE-A"; 3GPP Draft; R1-092157—Type2 Relay; 3rd Generation Partnership Project; Mobile Competence Centre; p. 1-11; May 4-8, 2009.

(Continued)

*Primary Examiner* — Siming Liu
(74) *Attorney, Agent, or Firm* — Conley Rose, P.C.; J. Robert Brown, Jr.

(57) ABSTRACT

Devices and methods are provided for managing hidden node interference. A communications session between a client node and an access node is affected by interference generated by a hidden relay node. The victim client node and the aggravator relay node are identified by the access node. The access node generates a set of scheduling instructions, which are then provided to the client node. The client node then uses the scheduling instructions to avoid further interference.

20 Claims, 9 Drawing Sheets

(56) References Cited

OTHER PUBLICATIONS

International Search Report and Written Opinion dated Feb. 28, 2012 for Application No. PCT/US2011/046223.

Alcatel-Lucent Shanghai Bell, et al; "Interference Analysis for Type I and Type II Relay"; 3GPP Draft; R1-092154 Interference Analysis for Type I and Type II Relay, 3rd Generation Partnership Project, Mobile Competence Centre; p. 1-6; May 4-8, 2009.

Dengkun Xiao, et al.; "LI Delay Impact on ICIC in Type I Relay"; 2009 International Conference on Wireless Networks and Information Systems; p. 140-143; 2009.

European Examination Report; Application No. 11745637.6; Nov. 12, 2014; 3 pages.

European Examination Report; Application No. 11745637.6; May 6, 2015; 4 pages.

\* cited by examiner

HIDDEN NODE INTERFERENCE ISSUE IN A TYPE II RELAY NETWORK

CROSS-REFERENCE TO RELATED APPLICATIONS

This is a U.S. National Stage of International Application No. PCT/US11/46223, entitled "HIDDEN NODE INTERFERENCE ISSUE IN A TYPE II RELAY NETWORK", filed Aug. 2, 2011, which is incorporated by reference in its entirety.

BACKGROUND

The implementation of various relay techniques is described in 3rd Generation Partnership Project (3GPP) Long Term Evolution Advanced (LTE-A) standards as a potential solution for providing cost-efficient delivery of high data transmission rates. As described, such techniques generally involve the use of a low-power, low-cost relay node (RN) that typically does not require wired backhaul access. Such RNs can not only offer high flexibility in their placement, but also facilitate fast, on-demand network rollout. Appropriate deployment of RNs can enlarge coverage areas, increase system throughput, reduce mobile power consumption, support group mobility, and simplify temporary network deployment. An additional benefit is the provision of a uniform end-user experience for both cell-center and cell-edge users.

Known approaches to the use of different types of relays are dependent upon the various functionalities each RN supports. The RNs are attached to the packet core network via an evolved Node B (eNB), which is referred to as Donor eNB. For example, LTE-A defines two types of RNs. A Type I RN behaves as a mini base station having full radio resource control. It has its own physical cell identifier and appears as an independent cell to the user equipment (UE) and transmits its own pilot/control signals. Conversely, a Type II RN has neither its own physical cell identifier nor does it transmit pilot/control signals. Furthermore, a Type II RN does not have any radio resource scheduling functionalities and only helps the evolved Node B (eNB) with data transmission. Accordingly, the donor eNB is responsible for scheduling schedule the packet transmissions to or from a Type II RN.

In an LTE network, each eNB identifies itself by broadcasting a unique signature sequence, called cell-specific reference signal (CRS). The CRS is a pseudo-random sequence generated as a function of its Cell ID. The resource elements used for CRS transmission also depend on its Cell ID. When selecting the serving cell, the UE measures the reference signal received power (RSRP) (i.e., the received signal power of CRS), a reference signal received quality (RSRQ), or both, from neighboring cells and the UE typically picks the strongest cell as the serving cell. The fact that a Type II RN has neither a cell ID nor broadcasts CRS results in the relay node becoming a hidden node during a serving cell selection process. As a result, a UE device selects its serving cell based on the observed signal strengths from the eNBs only and does not consider the signals from Type II relay nodes.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
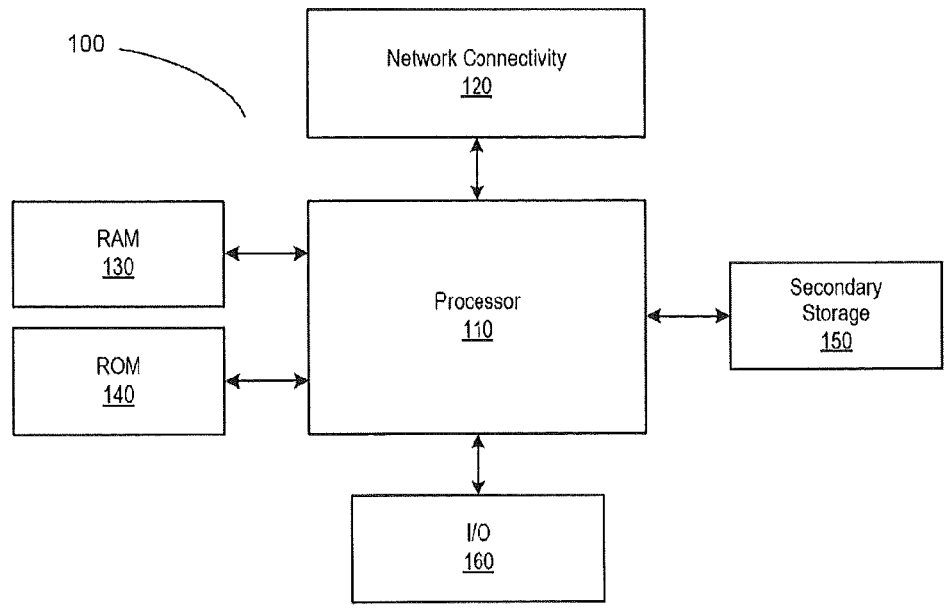
FIG. 1 depicts an exemplary system in which the present disclosure may be implemented.

The present disclosure is directed in general to communication systems and methods for operating same. In one aspect, the present disclosure relates to devices and methods for managing hidden node interference.

An embodiment is directed to a client node comprising processing logic configured to: establish communication with a first access node, detect interference with said communication, said interference generated by transmissions from a hidden relay access node (RN), wherein said hidden relay access node is served by a second access node, generate a set of interference data associated with said interference, and provide said set of interference data to said first access node, wherein said first access node processes said set of interference data to generate transmission scheduling instructions.

An embodiment is directed to a method for managing hidden node interference comprising using a client node to: establish communication with a first access node, detect interference with said communication, said interference generated by transmissions from a hidden relay access node (RN), wherein said hidden relay access node is served by a second access node, generate a set of interference data associated with said interference, and provide said set of interference data to said first access node, wherein said first access node processes said set of interference data to generate transmission scheduling instructions.

An embodiment is directed to an access node comprising processing logic configured to: establish communication with a client node, detect interference with said communication, said interference generated by transmissions from a hidden relay access node (RN), wherein said hidden relay access node is served by a second access node, perform interference identification operations to identify said hidden relay access node, and generate a set of interference data associated with said interference.

An embodiment is directed to a method for managing hidden node interference comprising using an access node to: establish communication with a client node, detect interference with said communication, said interference generated by transmissions from a hidden relay access node (RN), wherein said hidden relay access node is served by a second access node, perform interference identification operations to identify said hidden relay access node, and generate a set of interference data associated with said interference.

An embodiment is directed to a hidden relay access node comprising processing logic configured to: establish communication with a first client node, wherein said hidden relay access node is served by a first access node, detect interference with said communication, said interference generated by transmissions from a second client node, wherein said second client node is served by a second access node, generate a set of interference data associated with said interference, and provide said set of interference data to said first access node to enable said first access node to process said set of interference data to generate scheduling instructions.

An embodiment is directed to a method for managing hidden node interference comprising using a hidden relay to: establish communication with a first client node, wherein said hidden relay access node is served by a first access node, detect interference with said communication, said interference generated by transmissions from a second client node, wherein said second client node is served by a second access node, generate a set of interference data associated with said interference, and provide said set of interference data to said first access node to enable said first access node to process said set of interference data to generate scheduling instructions.

Devices and methods are provided for managing downlink (DL) hidden node interference at a client node. In various embodiments, a communication session between a client node and a first access node is affected by interference generated by a hidden relay node connected to a second access node. In these and other embodiments, the victim client node and the aggravator relay node are first identified. The first access node then generates a first set of scheduling instructions, which are provided to the client node, which uses them to avoid further interference from the hidden relay node served by the second access node. In one embodiment, the first set of scheduling instructions is generated by the first access node from a set of interference data received from the client node. In another embodiment, the first set of scheduling instructions is generated by the first access node from a set of interference data it generates by performing interference detection operations.

In various embodiments, the interference is experienced during a DL transmission from the first access node to the client node. In one embodiment, the first set of scheduling instructions comprise scheduling the transmission to a client node on cell-edge Physical Resource Blocks (PRBs) corresponding to the first access node. As used herein, cell-edge PRBs refer to PRBs that are reserved for transmissions to and from cell-edge users. In this embodiment, the hidden relay node receives a second set of scheduling instructions from the second access node, which are used to schedule the hidden relay node's DL transmission on cell-edge PRBs corresponding to the second access node. In another embodiment, the first set of scheduling instructions comprises instructions to schedule the client node's transmission on RN-ceasing-Tx subframes corresponding to the hidden relay node.

Devices and methods are also provided for managing uplink (UL) interference at a relay node. In various embodiments, a signal received from a first client node at a relay node attached to a first access node is affected by interference generated by a second client node attached to a second access node. In various embodiments, the client node generates interference at a hidden relay node during a UL transmission from the client node to the first access node. In these and other embodiments, the interference is experienced by the hidden relay node and the client node receives a third set of scheduling instructions from the first access node. In one embodiment, the third set of scheduling instructions comprise scheduling the client node's UL transmission on cell-edge Physical Resource Blocks (PRBs) corresponding to the first access node. In this embodiment, the hidden relay node receives a fourth set of scheduling instructions from the second access node, which are used to schedule the client node's transmission on cell-edge PRBs corresponding to the second access node. In another embodiment, the third set of scheduling instructions comprise instructions to schedule the client node's transmission on RN-ceasing-Rx subframes corresponding to the hidden relay node.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
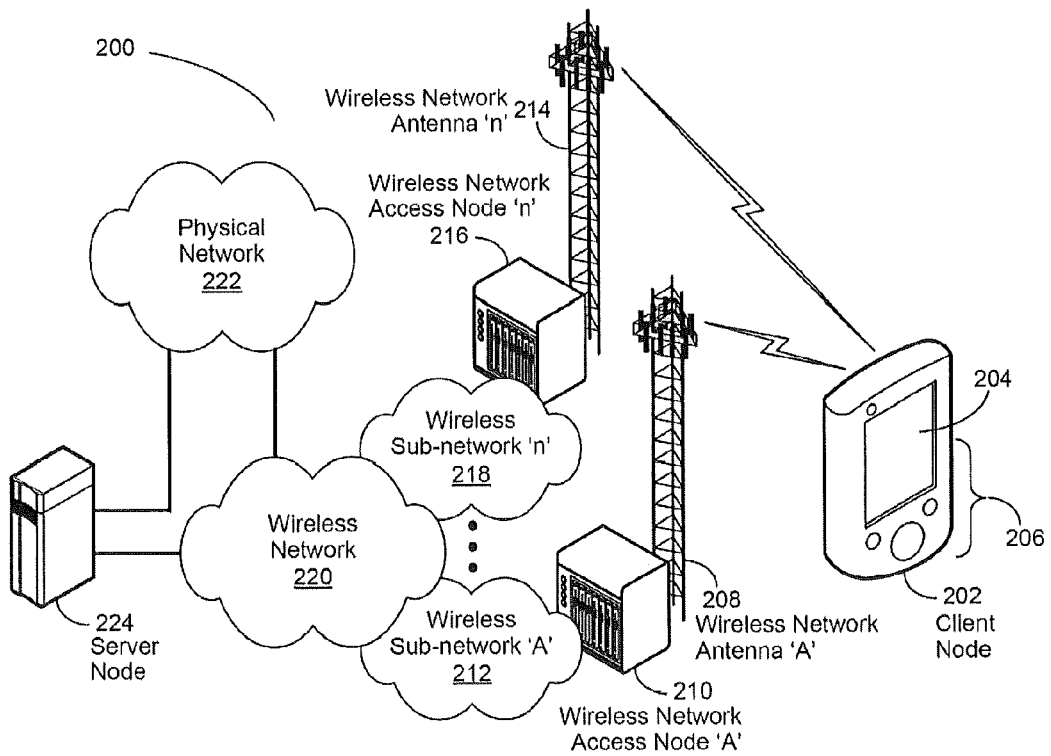
FIG. 2 shows a wireless-enabled communications environment including an embodiment of a client node.

FIG. 2 shows a wireless-enabled communications environment including an embodiment of a client node 202 as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
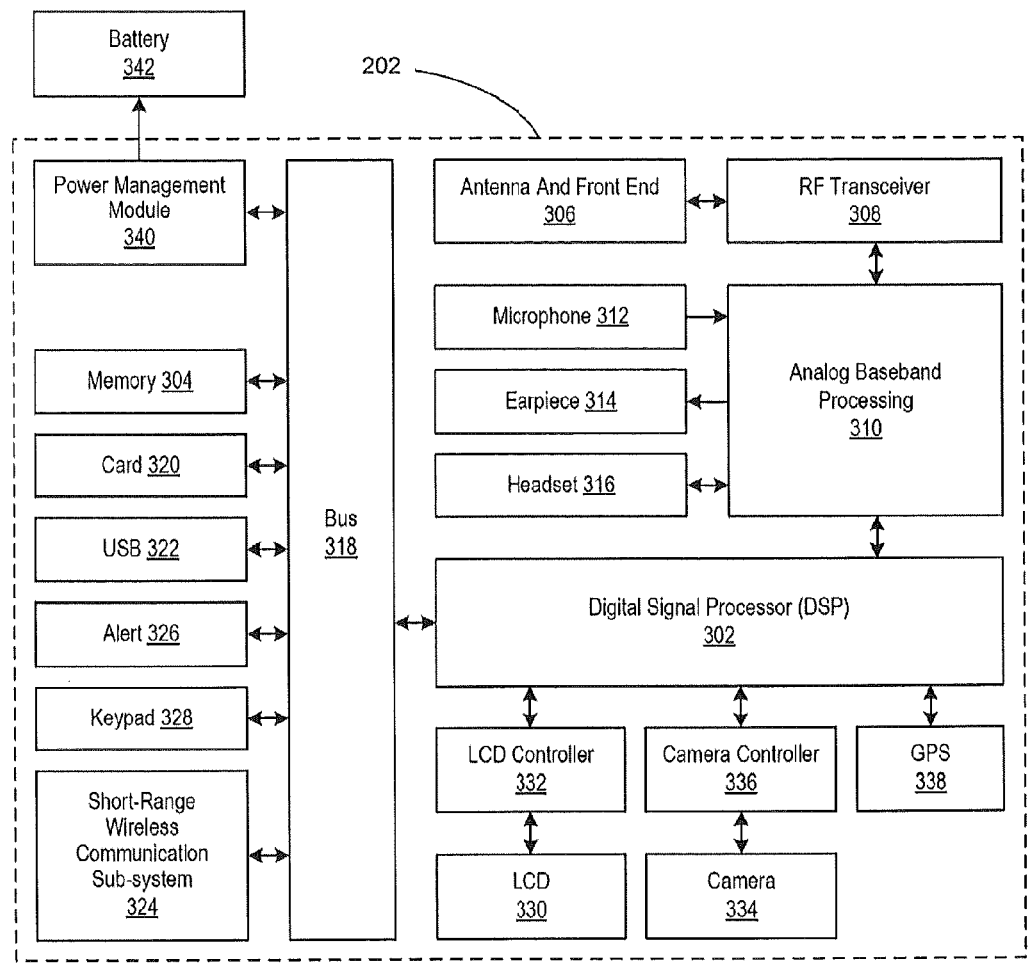
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
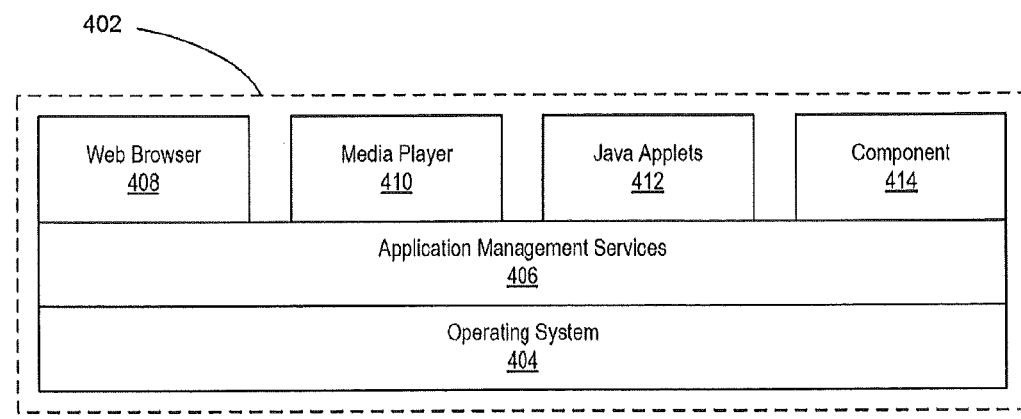
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Figure 5:
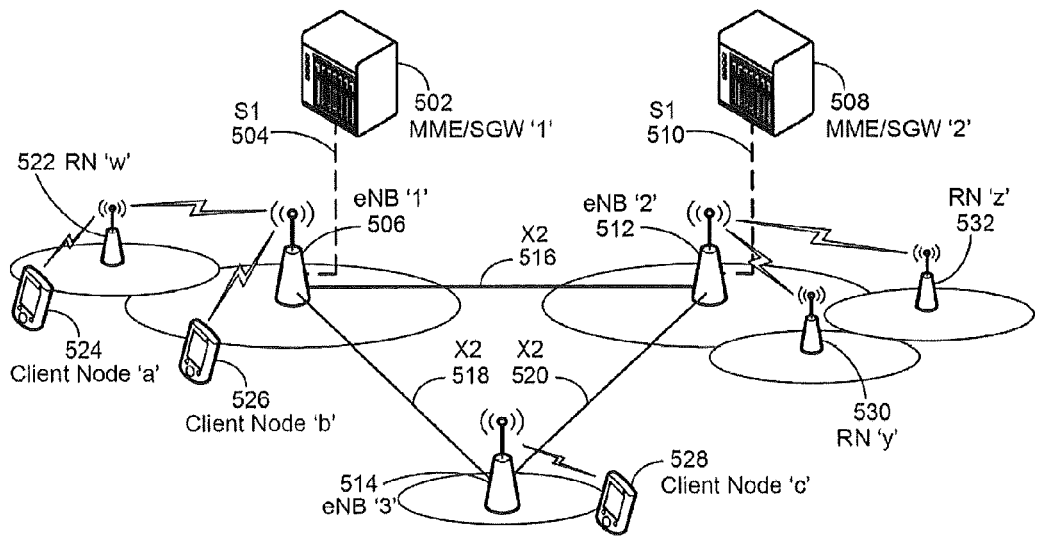
FIG. 5 is a simplified topological depiction of relay nodes implemented in a wireless-enabled communications environment.

FIG. 5 is a simplified block diagram of relay nodes (RNs) in a Long Term Evolution-Advanced (LTE-A) environment as implemented in accordance with an embodiment of the disclosure. As shown in FIG. 5, evolved Node B (eNB) '1' 506 and eNB '2' 512 are respectively served by Mobile Management Entity (MME)/Serving Gateway (SGW) '1' 502 and MME/SGW '2' 508 via S1 connections 504 and 510. As likewise shown in FIG. 5, RN 'w' 522, which serves client node 'a' 524, is positioned proximate to eNB '1' 506, which serves client node 'b' 526, and RNs 'y' 530 and 'z' 532 are positioned proximate to eNB '2' 512. Likewise, eNB '3' 514, which serves client node 'c' 528, is respectively interconnected via X2 connections 518 and 520 to eNBs '1' 506 and '2' 512, which are in turn interconnected via an X2 connection 516. In this and other embodiments, the client node 'a' 524 is able to indirectly access eNBs '1' 506 at a higher data rate, or a much lower transmission power level, through RN 'w' 522 than through a direct connection.

Skilled practitioners of the art will be aware that the use of different types of relays is dependent upon the various functionalities RNs 'x' 514, 'w' 522, 'y' 530, and 'z' 532 supports. For example, LTE-A defines two types of RNs. A Type I RN behaves as a mini base station having full radio resource control. It has its own physical cell identifier and appears as an independent cell to the user equipment (UE) and transmits its own pilot/control signals. Conversely, a Type II RN has neither its own physical cell identifier nor does it transmit pilot/control signals. Furthermore, a Type II RN may not have any radio resource scheduling functionalities and only helps the eNB with data transmission. Accordingly, the donor eNB (e.g., eNBs '1' 506 and eNB '2' 512) is responsible to schedule the packet transmissions from/to a Type II RN.

More specifically, a Type II relay node is an in-band relaying node characterized by RNs 'w' 522, 'y' 530, and 'z' 532 not having its own Physical Cell ID and thus would not create any new cells. Furthermore, RNs 'w' 522, 'y' 530, and 'z' 532 are transparent to Rel-8 user equipment (UE) devices, which are not aware of the presence of a Type II relay node. Furthermore, RNs 'w' 522, 'y' 530, and 'z' 532 can transmit on a Physical Downlink Shared Channel (PDSCH) but cannot transmit Cell-specific Reference Signal (CRS) or on a Physical Downlink Control Channel (PDCCH).

It will be appreciated that an in-band relay node implies that the eNB-relay link (i.e., a wireless backhaul) shares the same carrier frequency with relay-UE and eNB-UE links. In addition the RN (e.g., RNs 'w' 522, 'y' 530, and 'z' 532) could be either full-duplex or half-duplex for the sake of cost saving. For example, half-duplex implies that at any given time on the downlink (DL) or uplink (UL) frequency, the RN either transmits or receives. Likewise, due to lack of CRS from a Type II relay, a UE-specific reference signal is typically used for data transmission with Type II relay to enable channel estimation and data demodulation.

Figure 6A:
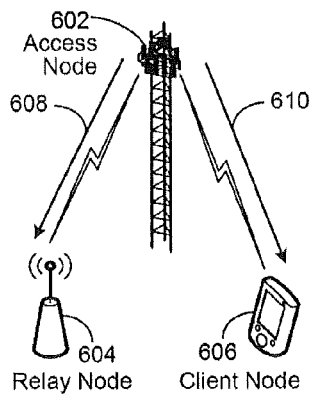
FIGS. 6*a-d* show cooperative transmission between an access node (AN) and a relay node (RN) on the downlink (DL) in a wireless-enabled communications environment.
Figure 6B:
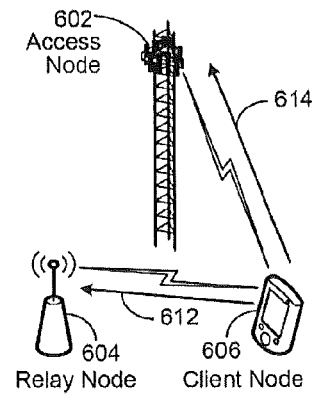

FIGS. 6a-d show cooperative transmission between an access node (AN) and a relay node (RN) on the downlink (DL) in a wireless-enabled communications environment implemented in accordance with an embodiment of the disclosure. In this embodiment, cooperative packet transmission from both an access node 602, such as an evolved Node B (eNB), and a RN 604, is implemented in a Type II relay network to improve the data rate on downlink (DL) transmissions. As shown in FIG. 6a, a client node 606, such as a user equipment (UE) device, measures the channel 610 based on the Cell-specific Reference Signal (CRS) or Channel State Information (CSI) Reference Signal (RS) and reports the Channel Quality Indicator (CQI)/Precoding Matrix Indicator (PMI)/Rank Indicator (RI) to the access node 602 (e.g., an eNB). The access node 602 determines the scheduling information including the scheduled subframe, the allocated Resource Blocks (RBs), the Modulation and Coding Scheme (MCS), precoding information, etc. The access node 602 then transmits 610 the initial DL transmission to the client node 606 on the selected downlink resources. Concurrently, the RN 604 monitors 610 the Physical Downlink Control Channel (PDCCH) and obtains corresponding information, such as the allocated RB, MCS information, and Transport Block (TB). The client node 606 and the RN 604 respectively perform decoding 610 of the TB from the access node 602. Referring now to FIG. 6b, assuming that the RN 604 successfully decodes 610 the TB, the client node 606 then transmits 614 an acknowledgement (ACK)/negative acknowledgement (NACK) message to the access node 602. Concurrently, the RN 604 monitors 614 the ACK/NACK transmission from the UE.

Figure 6C:
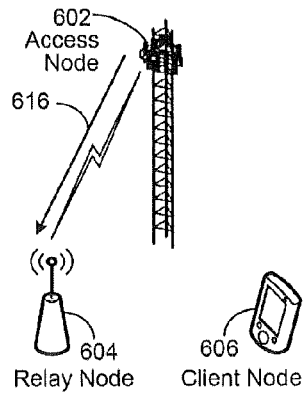
Figure 6D:
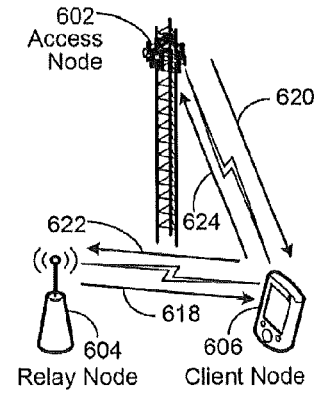

As likewise shown in FIG. 6c, in the event of a dynamic-scheduling-based retransmission, and if a NACK response is detected by the RN 604, the access node 602 determines the corresponding retransmission and provides 616 scheduling information associated with the retransmission to the RN 604. In the event of a non-adaptive synchronous retransmission, the access node 602 does not need to provide 616 the associated scheduling information to the RN 604. Referring now to FIG. 6d, the access node 602 and the RN 604 respectively retransmit 620, 618 the TB to the client node 606 simultaneously. After the client node 606 correctly receives the TB, an ACK message is respectively sent 622, 624 from the client node 606 to the RN 604 and the access node 602.

FIGS. 7a-d show cooperative transmission between an access node (AN) and a relay node (RN) on the uplink (UL) in a wireless-enabled communications environment implemented in accordance with an embodiment of the disclosure. In this embodiment, cooperative packet transmission from both an access node 602, such as an evolved Node B (eNB), and a RN 604, is implemented in a Type II relay network to improve the data rate on uplink (UL) transmissions.

Figure 7A:
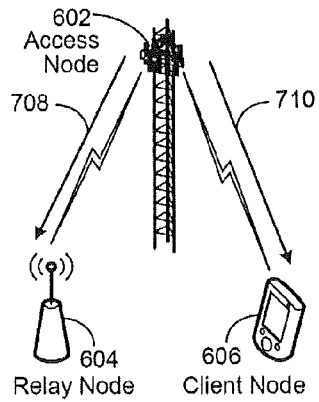
FIGS. 7*a-d* show cooperative transmission between an access node and a relay node on the uplink (UL) in a wireless-enabled communications environment.

As shown in FIG. 7a, a client node 606, such as a user equipment (UE) device, has uplink data to transmit and a Scheduling Request (SR) is sent to the access node 602. The access node 602 receives the Buffer Status Report (BSR)/Power Headroom Report (PHR) and determines the uplink transmission resource and the Layer 1 parameters such as modulation and coding information, etc. The access node 602 then informs 710 the client node 606 about the scheduling grant via the Physical Downlink Control Channel (PDCCH) Downlink Control Information. The RN 604 likewise detects 710 the transmission of the scheduling grant by a blind decoding procedure as implemented in a Rel-8 UE (e.g., client node 606). Accordingly, the RN 604 is aware of when, where, and how to receive the uplink initial transmission from the client node 606.

Figure 7B:
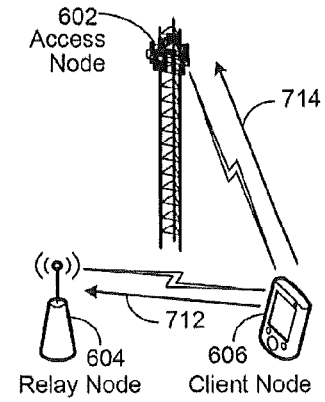
Figure 7C:
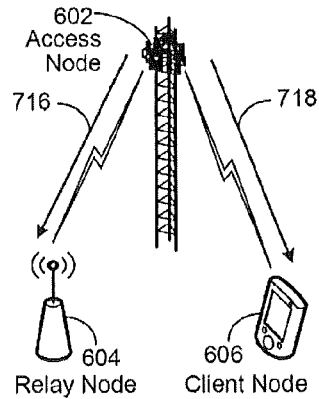
Figure 7D:
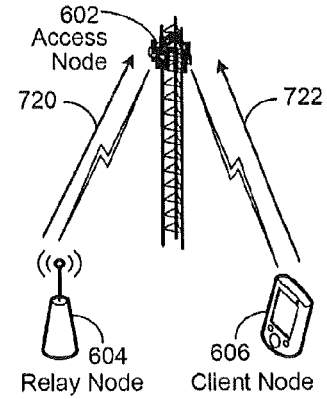

Referring now to FIG. 7b, the client node 606 performs an uplink transmission 714 to the access node 602. The access node 602 and the RN 604 perform decoding 714 of the TB from the client node 606. Assume that the RN 604 successfully decodes 712 the TB. As shown in FIG. 7c, the access node 602 then transmits 718 an acknowledgement (ACK)/negative acknowledgement (NACK) message to the client node 606. Concurrently, the RN 604 monitors 718 the Physical Hybrid ARQ Indicator Channel (PHICH) to be aware of the status of the transmission 714. Referring now to FIG. 7d, in the event of a NACK, the client node 606 and the RN 604 may simultaneously perform the uplink retransmission 722, 720 to the access node 602. After the access node 602 correctly receives the data, an ACK is transmitted over the PHICH to the client node 606. Contemporaneously, the RN 604 can detect the ACK and stop performing retransmissions.

Figure 8A:
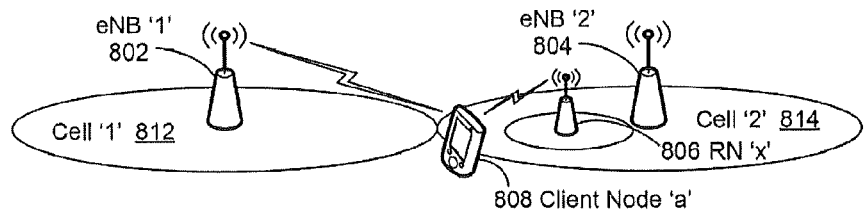
FIGS. 8*a-b* are a simplified topological depiction of interference experienced by a victim client or relay node from an aggravator client or relay node in a wireless-enabled communications environment.
Figure 8B:
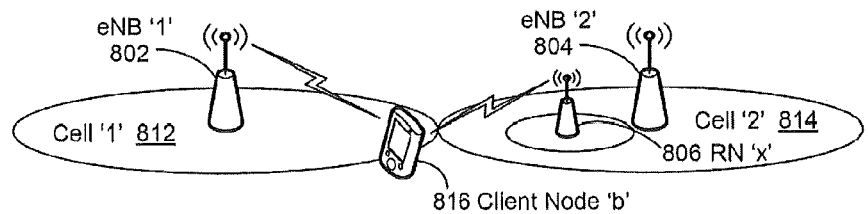

FIGS. 8a-b are a simplified topological depiction of interference experienced by a first client or relay node from an aggravator client or relay node in a wireless-enabled communications environment implemented in accordance with an embodiment of the disclosure. In an LTE network, each evolved Node B (eNB) identifies itself by sending a unique signature sequence, called cell-specific reference signal (CRS). The CRS is a pseudo-random sequence generated as a function of the eNB's Cell ID. The resource elements used for CRS transmission also depend on the Cell ID. When selecting the serving cell, the UE measures the reference signal received power (RSRP) (i.e., the received signal power of CRS) from neighboring cells and the UE typically picks the strongest cell as the serving cell. The fact that a Type II RN has neither a cell ID nor transmits CRS results in it becoming a hidden node during a serving cell selection process. As a result, a UE device selects its serving cell based on the observed signal strengths from the eNBs only and does not consider the signals from Type II relay nodes.

As shown in FIG. 8a, RN 'x' 806 and client node 'a' 808 are within the coverage area of cell '2' 814, which is associated with eNB '2' 804, and they are proximate to one another. As likewise shown in FIG. 8a, eNB '2' 804 is the donor eNB for RN 'x' 806. As used herein, a donor eNB refers to a eNB through which a RN (e.g., RN 'x' 806) is connected to the packet core network. In this embodiment, when the client node 'a' 808 selects its serving eNB, it examines the signal strengths of CRS from eNB '1' 802 and eNB '2' 804 and does not consider RN 'x' 806. As shown in FIG. 8a, it is possible for client node 'a' 808 to be within the coverage area of eNB '2' 804 while its serving cell is eNB '1' 802 due to the random factors such as shadowing in the propagation environment. As a result, since client node 'a' 808 and RN 'x' 806 are proximate to one another and they belong to different eNBs, client node 'a' 808 will observe significant interference from RN 'x' 806 on downlink (DL) transmissions whenever RN 'x' 806 transmits on the DL frequency. On uplink (UL), RN 'x' 806 could observe significant interference when client node 'a' 808 is transmitting as it may communicate with eNB '1' 802 directly and transmit at a high power.

Likewise, as shown in FIG. 8b, similar interference issues may be encountered when RN 'x' 806 is implemented close to the cell edge of eNB '2' 804. More specifically, RN 'x' 806 may create strong interference to client node 'b' 816 within the coverage area of eNB '1' 802 on DL, and conversely, the client node 'b' 816 may create strong interference to RN 'x' 806 on UL. It will be appreciated that the described interference issue could result in an impact on both cell-edge and non-cell edge client nodes although cell-edge client nodes are more likely to be affected.

Known approaches to these issues include LTE Rel-8 Inter-cell Interference Coordination (ICIC), which can be used to avoid the hidden node interference. However, such approaches can prove to be inefficient. More specifically, ICIC coordinates the data transmissions of cell-edge client nodes from neighboring cells such that the inter-cell interferences they observe are reduced. With ICIC, cell-edge client nodes from neighboring cells occupy different Physical Resource Blocks (PRBs) to avoid strong inter-cell interference. For example, to coordinate the UL data transmissions, the serving cell sends High Interference Indication (HII) to the neighboring cells to indicate the PRBs in which the serving cell will schedule its cell-edge client nodes, thereby causing high inter-cell interference. Likewise, to coordinate DL data transmissions, the serving cell sends Relative Narrow-band TX Power (RNTP) indication to the neighboring cells to indicate the PRBs that the serving cell will use for its cell-edge UEs and transmit at a high power. The neighboring cell that receives HII/RNTP will try to avoid scheduling its cell-edge client nodes in the high-interference PRBs indicated by HII/RNTP and instead, schedule its cell-center client nodes in these PRBs to avoid the strong inter-cell interference. The HE and RNTP are exchanged among neighboring cells via X2 interface.

However, unnecessary scheduling constraints to all RNs and a large number of client nodes may result when using ICIC to avoid the interference from hidden RNs. Moreover, such scheduling constraints may require pessimistic implementations whenever there are Type II RNs in the system. For example, as shown in FIGS. 8a-b on the DL eNB '2' 804 may have to limit DL transmissions from all of its associated RNs (e.g., RN 'x' 806) to the PRBs reserved for its cell-edge client nodes (e.g., client node 'a' 808). At the same time, client nodes (e.g., client node 'b' 816) within the coverage are of eNB '1' 802 with bad performance, such as high packet error rate or late Hybrid Automatic Repeat Request (HARQ) termination, are scheduled to its cell-edge PRBs. As a result, without specifically identifying victims and aggravators, the network has to consider all RNs as aggravators and all client nodes with bad performance as victims, although it is likely that a nominal number of client nodes or RNs are either true victims or true aggravators. Likewise, eNB '2' 804 needs to limit the UL transmissions to all of its associated RNs (e.g., RN 'x' 806) to the cell-edge PRBs and eNB '1' 802 schedules all client nodes (e.g., client node 'b' 816) that may potentially cause interference to the RNs (e.g., RN 'x' 806) in the neighboring cells to the cell-edge PRBs.

From the foregoing, it will be apparent to those of skill in the art that ICIC is inefficient in coping with the hidden node interference due to the lack of mechanisms to detect whether RNs are actually causing problems in the system, and likewise, the lack of mechanisms to identify individual victims and aggravators. It will likewise be apparent that it is possible that RNs are not causing interference to client nodes in neighboring cells or maybe only one RN is creating interference. However, scheduling constraints are unnecessarily imposed for all RNs, which effectively places more client nodes under fractional frequency reuse and reduces system spectral efficiency significantly.

Figure 9:
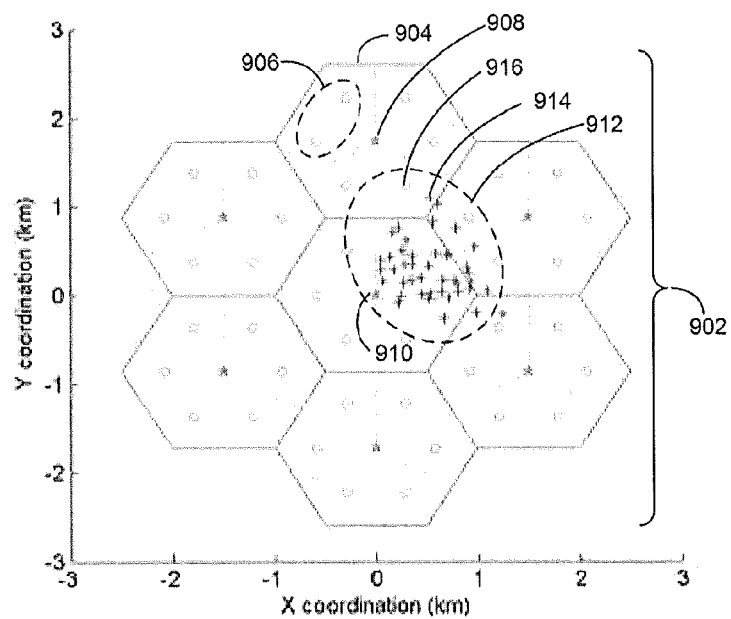
FIG. 9 is a simplified topographical depiction of a client node experiencing DL interference from a relay node whose donor cell is a neighboring cell.

FIG. 9 is a simplified topographical depiction of a client node experiencing DL interference from a relay node whose donor cell is a neighboring cell. In an embodiment, a simulated network comprising 57 cells is simulated, 7 cells 902 of which are shown in FIG. 9, with each cell 904 comprising two relay nodes, shown generally by reference numeral 906, placed at a distance of ⅔ the cell radius from each evolved Node B (eNB), shown generally by reference numeral 908. In various embodiments, the spacing between eNBs 908 may be approximately 500 meters. Those of skill in the art will realize that the cell 904 shown in FIG. 9 represents the intended geographic boundary of that cell. In practice, however, each eNB may provide a coverage area that may not coincide exactly with the geographic boundary of the respective cell. For example, in FIG. 9, eNB 910 may provide service for a plurality of client nodes within a coverage area illustrated generally by reference numeral 912. In this illustration, a client node, e.g., client node 914 may experience interference from a relay node, e.g., RN 916, thus necessitating the remedial interference resolution methods described herein.

Using cell 904 as an example for the simulation discussed herein, the respective transmit powers of each eNB, 908 and each relay node (RN), e.g., 906 is 46 dBm and 30 dBm, respectively. Table 1 lists the remaining simulation parameters. In the simulation, each of the client nodes in coverage area 912 chooses its serving cell based on the DL signal strengths from eNBs, as RNs do not send control signals. The strongest eNB is chosen as the respective client node's serving cell.

TABLE 1

Simulation Parameters

| Parameter | Assumption/Value |
|---|---|
| Cellular layout | Hexagonal grid, 57 cells |
| Relay layout | 2 RNs per cell at ⅔ of cell radius |
| Inter-site distance (ISD) | 500 m |
| Distance-dependent path loss for eNB → UE | $PL_{LOS}(R) = 103.4 + 24.2 \log10(R)$<br>$PL_{NLOS}(R) = 131.1 + 42.8 \log10(R)$, R in km.<br>$Prob(R) = \min(0.018/R, 1)*(1 - \exp(-R/0.063)) + \exp(-R/0.063)$ |
| Distance-dependent path loss for RN → UE | $PL_{LOS}(R) = 103.8 + 20.9 \log10(R)$<br>$PL_{NLOS}(R) = 145.4 + 37.5 \log10(R)$, R in km<br>$Prob(R) = 0.5 \cdot \min(0.05, 5 \exp(-0.156/R)) + \min(0.5, 5 \exp(-R/0.03))$ |
| Distance-dependent path loss for eNB -> relay | $PL_{LOS}(R) = 100.7 + 23.5 \log10(R)$<br>$PL_{NLOS}(R) = 125.2 + 36.3 \log10(R)$, R in Km<br>$Prob(R) = \min(0.018/R, 1)*(1 - \exp(-R/0.072)) + \exp(-R/0.072)$<br>Bonus factors for optimized relay deployment as described in [3] |
| Shadowing standard deviation | 10 dB (RN to UE); 8 dB (eNB to UE), 6 dB (eNB to RN) |
| Shadowing correlation | 0.5 between sites (including eNB and RN); 1 between sectors per site |
| Penetration loss | 20 dB from eNB to UE, 20 dB from RN to UE, 0 dB from eNB to RN |
| Antenna pattern for macro eNBs to UEs (horizontal) | $A(\theta) = -\min\left[12\left(\dfrac{\theta}{\theta_{3dB}}\right)^2, A_m\right]$<br>$\theta_{3dB} = 70$ degrees, $A_m = 25$dB (70 degree horizontal beamwidth) |
| Antenna pattern for macro eNBs to UEs (vertical) | $A(\theta) = -\min\left[12\left(\dfrac{\theta - \theta_{etilt}}{\theta_{3dB}}\right)^2, (SLA)_v\right]$<br>$\theta_{3dB} = 10$ degrees, $(SLA)_v = 20$dB<br>downtilt 15 degrees |
| Combining method in 3D antenna pattern | $A(\phi, \theta) = -\min\{-[A_H(\phi) + A_V(\theta)], A_m\}$ |
| Antenna pattern for relays to UEs (horizontal) | 0 dB for all directions |

TABLE 1-continued

Simulation Parameters

| Parameter | Assumption/Value |
|---|---|
| Carrier frequency | 2 GHz |
| Bandwidth | 10 MHz |
| Minimum distance between UE and eNB/RN | 35 m between UE and eNB, 10 m between UE and RN |
| Tx power | 46 dBm for eNB, 30 dBm for RN |
| BS antenna gain (incl. cable loss) | 14 dBi |
| Relay antenna gain (incl. cable loss) | 5 dBi |
| UE antenna gain | 0 dBi |
| UE noise figure | 9 dB |
| eNB noise figure | 5 dB |
| Fast fading | Disabled |

In the simulation of this embodiment, the following criteria are used to determine the association of the client node to the eNB and the RN on the DL:

1. If the signal strength from eNB–the signal strength from the RN>XdB, then the client node is served by the eNB.

2. Otherwise, the client node is served by both the eNB and the RN via cooperative transmission (i.e., data transmission from both the eNB and the RN).

In this simulation, assume X=5 dB. If the client node is served by both the eNB and the RN, the Signal to Interference-plus-Noise Ratio (SINR) of a cooperative transmission is calculated as the sum of signal powers from the eNB and the RN divided by the interference. Accordingly, due to the absence of control signals from the RNs, each of the client nodes respectively chooses its serving cell based on the DL signal strengths from eNBs. It is possible that a cell-edge user is in the geographical area of a cell 'A'. However, as shown in FIG. 9, Cell 'B' becomes its serving cell due to the random factors such as shadowing in the propagation environment. In this case, the user could see strong interference from the relay node in Cell 'A'. Likewise, due to the better propagation between the eNB and the individual client node, higher eNB transmit power, and larger eNB antenna gain, an individual cell-edge client node may see stronger signal strength from the eNB compared to the signal strength from the RN. In this case, the cell-edge user is only served by the eNB and could see interference from RNs in neighboring cells.

Figure 10:
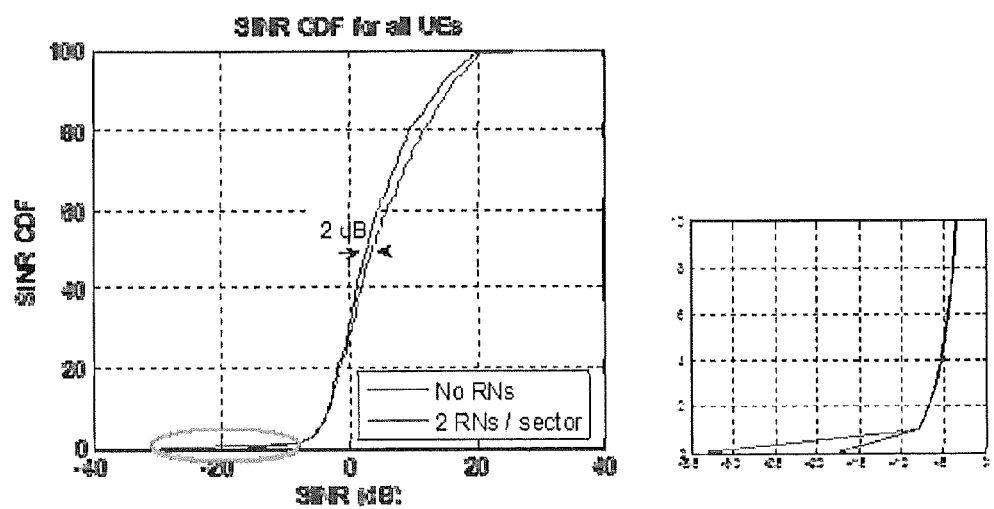
FIG. 10 is a graphical depiction of the cumulative distribution function of the Signal to Interference plus-Noise Ratio (SINR) of a DL transmission with a Type II relay node as observed in the simulated network depicted in FIG. 9.

FIG. 10 is a graphical depiction of the cumulative distribution function of the Signal to Interference plus-Noise Ratio (SINR) of a downlink (DL) transmission with a Type II relay node as observed in the simulated network depicted in FIG. 9.

Figure 11:
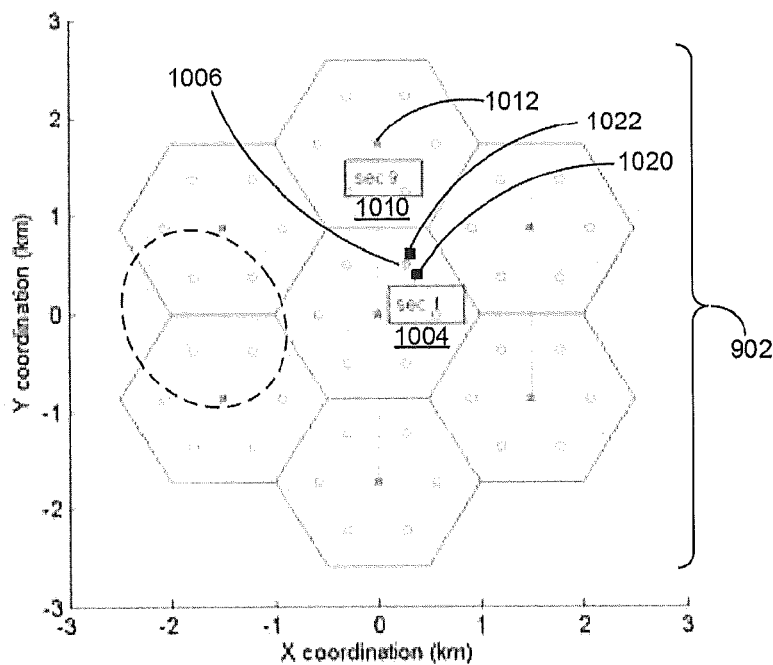
FIG. 11 is a simplified topographical depiction of a relay node experiencing UL interference from a client node in a neighboring cell.

FIG. 11 is a simplified topographical depiction of a relay node experiencing uplink (UL) interference from a client node in a neighboring cell. In this embodiment, client node 'a' 1020 belongs to cell '1' 1004 and is served by the nearby RN 1006. Client node 'b' 1022, although in the geographical area of cell '1' 1004, belongs to cell '9' 1010 and is served by the eNB 1012 of cell '9' 1010. Client node 'b' 1022 transmits at a high power, and since it is very close to the serving RN 1006 of client node 'a' 1020, it creates significant interference for the RN 1006 to decode the signal from client node 'a' 1020.

In this embodiment, the following criteria are used to determine the association of the client node to the eNB and the RN on the UL:

1. If coupling loss of the client node–the eNB<coupling loss of the client node–the RN, then the client node is served by both the eNB and the RN 2. Otherwise, the client node is served by eNB The coupling loss includes the path loss, shadowing, antenna gains of the transmitter and receiver, and penetration loss.

In this simulation, open loop power control is used to set the transmit powers per Resource Block (RB) for the client node and the RN. Assume that P0=–106 dBm and alpha=1 (no fractional power control). If the client node is served by the eNB, then the client node transmit power per RB is min (P0–the coupling loss of the client node–the eNB, client node maximum power). If the client node is served by the RN, then the client node transmit power per RB is min(P0–the coupling loss of the client node–the RN, client node maximum power). The RN transmit power per RB is min(P0–the coupling loss of the RN–the eNB, RN maximum power).

Monte Carlo simulation is then used to examine the client node UL SINR. Client nodes are uniformly dropped in the 57 cells, 7 cells 902 of which are shown in FIG. 9, and each client node finds the serving cell based on the DL signal strengths from various eNBs. A client node from the center cell is randomly picked and considered as the target client node. Then, 56 interfering client nodes are randomly selected, one from each cell. The SINR for initial transmission is calculated. If the target client node is served by an eNB, then the SINR at the serving eNB is calculated. However, if the target client node is served by an RN, then the SINR at the serving RN is calculated. The performance of an RN-served client node is primarily determined by the SINR observed by the RN, assuming a perfect link between the eNB and the RN. When modeling the interference, if the interfering client node is served by a RN, a 50% probability is assumed that only the interfering client node will transmit and a 50% probability that both the interfering client node and the RN will transmit.

Figure 12:
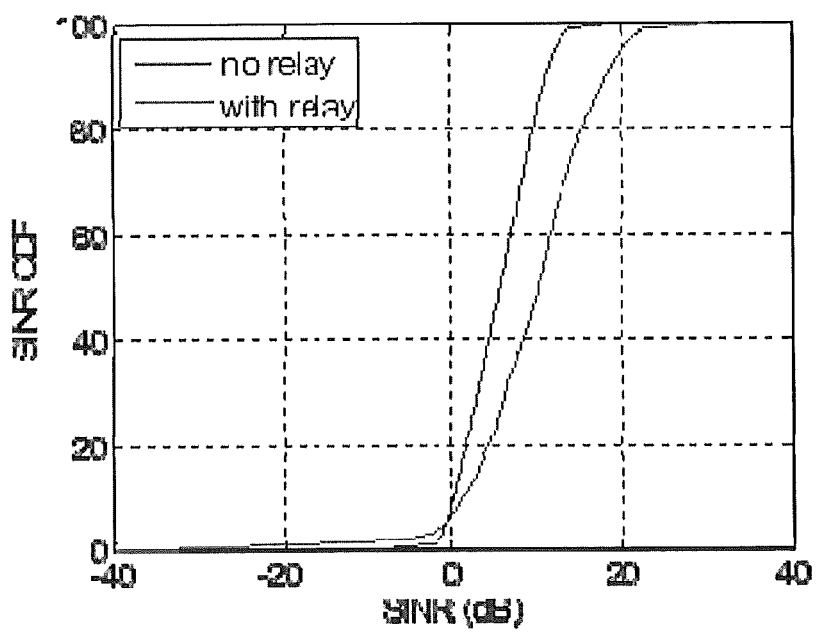
FIG. 12 is a graphical depiction of the cumulative distribution function of the SINR of a UL transmission with a Type II relay node as observed in the simulated network depicted in FIG. 11.

FIG. 12 is a graphical depiction of the cumulative distribution function of the Signal to Interference plus-Noise Ratio (SINR) of an uplink (UL) transmission with a Type II relay as observed in the simulated network depicted in FIG. 11.

Figure 13:
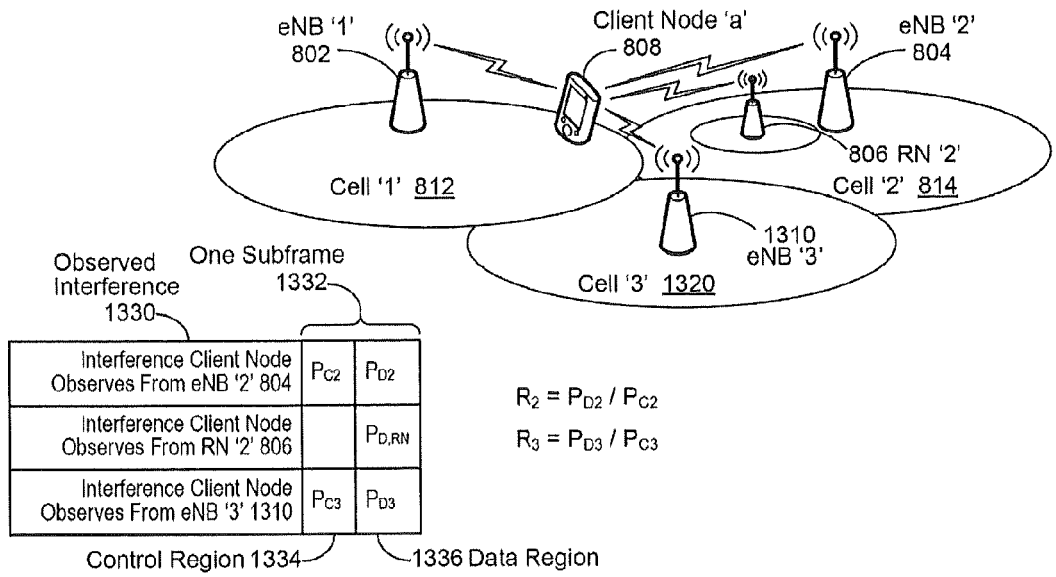
FIG. 13 is a simplified topological depiction of the effect of interference in data and control regions in a wireless-enabled communications environment.

FIG. 13 is a simplified topological depiction of the effect of interference in data and control regions in a wireless-enabled communications environment implemented in accordance with an embodiment of the disclosure. As described in greater detail herein, Type II relay nodes (RNs) may create unexpected interference on both the uplink (UL) and the downlink (DL). On the DL, RNs create strong inter-cell interference to client nodes in neighboring cells. More specifically, the RN is the aggravator and client node is the victim. Conversely, on the UL, client nodes create strong inter-cell interference to RNs in the neighboring cells. More specifically, the client node is the aggravator and the RN is the victim.

In various embodiments, a determination is first made whether Type II RNs are causing/experiencing interference. If so, then victims and aggravators are identified and interference coordination is applied as described in greater detail herein. In these and other embodiments, aggravators and victims are separately identified for UL and DL transmissions, since an aggravating RN on a DL transmission may not necessarily be a victim RN on a UL transmission. It will be appreciated that there is a tradeoff between the amount of effort involved by the network and the client node and the accuracy of identifying aggravators and victims. For example, less network and client node effort may result in the inclusion of more RNs and client nodes as potential aggravators and victims.

It will likewise be appreciated that the various embodiments described in greater detail herein are equally applicable for both half-duplex and full-duplex RNs unless otherwise stated. Furthermore, these various embodiments may not be limited to the hidden node issue caused by Type II relay. For example, they could likewise be applicable to other hidden node issue caused by Radio Remote Heads (RRHs) that do not send a Cell-specific Reference Signal (CRS).

In various embodiments, a Type II relay node sends Physical Downlink Shared Channel (PDSCH) and may not send Physical Downlink Control Channel (PDCCH) in a subframe-level synchronized network. In these embodiments, the interference a client node observes on the control region consists of the signal transmissions from all neighboring evolved Node Bs (eNBs). As a result, the interference experienced by the client node over the PDSCH region consists of signal transmissions from neighboring eNBs as well as from neighboring RNs. Accordingly, one method for a client node to identify the presence of a nearby hidden RN is to compare interference levels observed or measured over the control and data regions. However, an eNB may transmit PDSCH and PDCCH at different power levels due to different target error rates and different modulation and coding schemes for PDCCH and PDSCH. As a result, the client node needs to scale or adjust the measured interference levels before it can compare the two interference levels.

For example, as shown in FIG. 13, eNB '1' 802 is the serving cell for client node 'a' 808 and provides a corresponding coverage area for cell '1' 812, while RN '2' 806 is associated with eNB '2' 804 and resides within a corresponding coverage area for cell '2' 814. As likewise shown in FIG. 13, eNB '3' has a corresponding coverage area for cell '3' 1320. In this embodiment, the ratio of the average transmit power levels over the PDSCH region to PDCCH region from eNB '2' 804 and eNB '3' 1310 are respectively $R_2$ and $R_3$. Likewise, the interference 1330 that client node 'a' 808 observes on the control region is $P_{c2}+P_{c3}$. Accordingly, client node 'a' 808 should adjust the observed interference 1330 to $R_2*P_{c2}+R_3*P_{c3}$ in order to take the power difference on PDSCH and PDCCH into account.

However, client node 'a' 808 typically only estimates the total interference 1330 $P_{c2}+P_{c3}$ and does not estimate $P_{c2}$ and $P_{c3}$ separately. Furthermore, the separate power adjustment in $R_2*P_{c2}+R_3*P_{c3}$ is difficult to achieve. One approach is for the client node 'a' 808 to use $R_{avg}*(P_{c2}+P_{c3})$ to approximate $R_2*P_{c2}+R_3*P_{c3}$, where $R_{avg}=(R_2+R_3)/2$ (i.e., the average power ratio of PDSCH to PDCCH of neighboring cells). Likewise, eNB '1' 802 could inform client node 'a 808 of $R_{avg}$ via higher layer signaling such as Radio Resource Control (RRC) or System Information Broadcast (SIB). It will be appreciated that the R values of neighboring cells need to be exchanged among eNBs on backhaul link when calculating $R_{avg}$. To avoid such signaling overhead, client node 'a' 808 could also use the power ratio of PDSCH to PDCCH of its serving cell (e.g., eNB '1' 802) to approximate $R_{avg}$.

Likewise, client node 'a' 808 could measure the interference 1330 levels in the control 1334 and the data 1336 regions over an observation window of N subframes 1332. If there are a significant number of subframes out of the N subframes 1332 observing higher interference 1330 levels on the data region 1336 than on the control region 1334, then it implies hidden RN(s), such as RN '2' 806, are nearby and that client node 'a' 808 is a victim. More specifically:

1. For each of the N subframes 1332, client node 'a' 808 measures the interference 1330 level in the control region 1334, $I_{control,i}$, i=1 . . . N, based on the CRS in the control region 1334. Client node 'a' 808 also measures the interference 1330 level in the data region 1336, $I_{data,i}$, i=1 . . . N, based on the CRS in the data region 1336. To be more specific:

$$I_{control,i}=R_{control,i,total}-R_{control,i,servingcell}$$

where $R_{control,i,total}$ represents the total received power measured by client node 'a' 808 over the resource elements (REs) used by the serving cell (e.g., eNB '1' 802) to transmit the CRS in the control region 1334. Accordingly, $R_{control,i,servingcell}$ represents the received power from the serving cell measured by client node 'a' 808 over the REs used by the serving cell to transmit the CRS in the control region 1334. Likewise, $$I_{data,i}=R_{data,i,total}-R_{data,i,servingcell}$$

where $R_{data,i,total}$ represents the total received power measured by client node 'a' 808 over the REs used by the serving cell (e.g., eNB '1' 802) to transmit the CRS in the data region 1336. Accordingly, $R_{data,i,servingcell}$ represents the received power from the serving cell measured by client node 'a' 808 over the REs used by the serving cell to transmit the CRS in the data region 1336.

2. Count the number of subframes with $I_{data,i}-I_{control,i}*R_{avg}>T$. Assume that there are K subframes 1332 out of the N subframes 1332 with the interference 1330 level of the data region 1336 being higher than that of the control region 1334 by T.

3. If $K>T_f*N$, then it implies that hidden RN(s) are nearby and the client node 'a' 808 is a victim because of the additional interference 1330 from the hidden RN(s).

It will be appreciated that thresholds T and $T_f$ can be preconfigured at client node 'a' 808 or conveyed to it by its serving cell via a higher layer message such as radio resource control (RRC) or system information block (SIB).

For example, to detect a hidden Type II RN (e.g., RN '2' 806) within 'x' km from client node 'a' 808, then 'T' is set such that $T=P_{TX,RN}*PL(x)*\beta$ (all terms in linear scale), where $P_{TX,RN}$ is the RN transmit power, PL(x) is the path loss at distance x km, and $\beta$ is the average RB loading factor of RN (i.e. the average ratio of the number of active RBs to the total number of RBs in a subframe). Parameter $T_f$ represents the interference severity for declaring the hidden node issue. If the hidden node interference impacts the victim client node (e.g., client node 'a' 808) for only a small number of subframes, then the system may choose do nothing and the performance of client node 'a' 808 may not be degraded much with the help of Hybrid Automatic Repeat Request (HARQ). Likewise, client node 'a' 808 may only report the hidden node interference if the RN is creating a significant amount of interference and interference coordination is necessary. Additionally, the criterion $I_{data,i}-I_{control,avg}*R_{avg}>T$ in Step 2 above, where $I_{control,avg}$ is the average interference level in the control region 1334, can be used to improve detection. The estimate $I_{control,avg}$ can be obtained via filtering $I_{control,i}$ from a number of subframes 1332.

In various embodiments, hidden RNs are likewise detected by comparing the interference 1330 on the data region 1336 to the nominal interference 1330 the client node 'a' 808 would observe in the data region 1336 if RNs are not transmitting on the access link, which is the link between RN '2' 806 and client node 'a' 808. For example, the term $I_{control,i}*R_{avg}$ in Step 2 above is an estimate of the nominal interference 1330 in the data region 1336. If the RNs in the system have a pre-configured or semi-static transmission pattern on access links (e.g., during certain subframes RNs do not transmit on access link), the nominal interference 1330 can be simply obtained by client node 'a' 808 estimating the interference on the data region 1336 during the RN-ceasing-transmit (Tx) subframes. In another embodiment, the hidden RNs may be detected by the variance of the observed interference on the data region as well. Since the transmissions of the hidden RNs are not likely to be continuous, the interference observed on the data region may be changed reasonably large from time to time and this could be an indicator of the hidden RN existence.

It will be appreciated that such hidden RN detection is only needed for client nodes operating in a connected mode. Furthermore, the connected client node may only need to perform detection operations under certain conditions. Accordingly, activation and deactivation criteria can be applied to save a client node's battery and to reduce processing overhead. For example, since a cell-center client node is unlikely to observe interference from RNs in a neighboring cell, the client node could autonomously perform detection operations if the pathloss to the serving eNB estimated by the client node is larger than a predetermined threshold value. If not, then the client node can elect to not perform hidden RN detection operations. In various embodiments, the pathloss threshold can be pre-configured at the client node or conveyed to it via higher-layer messages such as RRC or SIB. Likewise, the client node may generate a hidden-node indicator or no-hidden-node indicator for each observation window of N subframes when it approaches, or moves away from, RN(s) in a neighboring cell to avoid a ping-pong phenomenon. In various embodiments, if consecutive $M_{in}$ hidden-node indicators are observed over a period of time, the client node will declare hidden node interference. The client node will likewise declare the lack of hidden node interference if consecutive $M_{out}$ no-hidden-node indicators are observed. The parameters $M_{in}$ and $M_{out}$ can be pre-configured at the client node or conveyed to it via higher layer message such as RRC or SIB.

The client node can likewise notify its serving eNB if it believes that there is a hidden RN nearby. Upon the client node leaving the coverage area of a hidden RN and declaring the absence of hidden node interference, it may need to notify its serving eNB as well. The client node can likewise provide the corresponding measurements and let the eNB determine whether there is a hidden RN issue. For example, the client node may provide information related to the observed interference 1330 over the control region 1334 and the data region 1336 separately and the eNB will determine whether there is a hidden RN close by. The eNB only needs to configure a new measurement object for the interference 1330 measurement over the control region 1334 and the data region 1336. Likewise, the eNB could activate or deactivate this measurement for a particular client node via measurement control signaling. The eNB may likewise activate this measurement when the number of DL Hybrid Automatic Repeat Request (HARQ) retransmissions is significantly increased for some HARQ processes or the Packet Error Rate (PER) is higher than a predetermined threshold value. Likewise, the eNB may deactivate this measurement when the HARQ termination or PER returns to its normal level.

Those of skill in the art will be aware that legacy Rel-8/9/10 UE devices (i.e., client nodes) do not support the above detection techniques and the network may be responsible for identifying interference victims. For example, if the network observes a non-cell-center client node having a bad performance on DL, such as a high packet error rate or late HARQ termination, the network could suspect that there is a hidden RN near the client node and consider it a victim. However, this approach may result in some false positives, as the poor performance of some client nodes may be caused by reasons other than the interference from hidden RNs.

Alternatively, the network could trigger aperiodic layer 1 feedback, such as a wideband or sub-band Channel Quality Indicator (CQI) report, from the client node to identify whether there is a hidden RN issue. As an example, the serving cell could configure the client node to report a periodical wideband CQI. If there is a hidden RN interfering with a client node operating in a half-duplex mode with a pre-configured transmission pattern, the reported CQI will experience different values from subframe to another. In another example, the serving cell could configure the client node to report sub-band CQI. If some sub-band CQI values are significantly worse than the others due to the possibility of hidden RN transmissions, it could indicate a hidden RN near the client node. This method would identify the existence of a hidden RN in the scenario of a full-duplex RN operating within a sub-band of the system. It will be appreciated that these network-based, backwards-compatible approaches are applicable to post Rel-10 client nodes as well.

Figure 14:
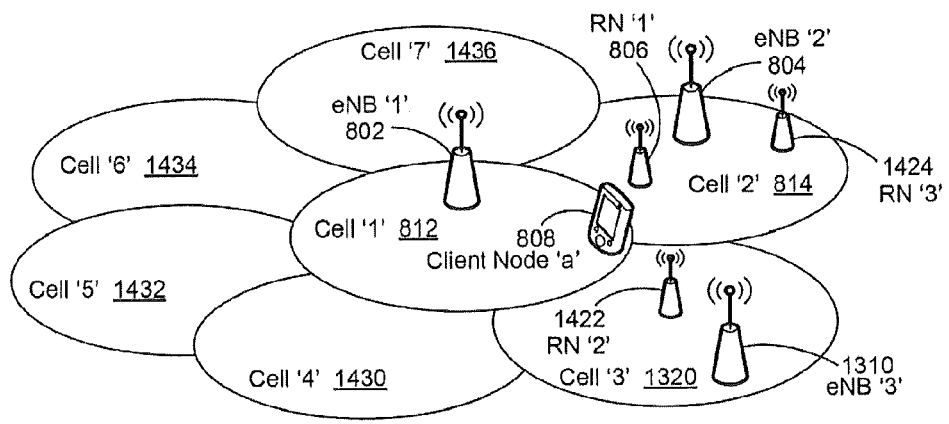
FIG. 14 is a simplified topological depiction of an aggravating relay node (RN) causing DL interference at a client node in a wireless-enabled communications environment.

FIG. 14 is a simplified topological depiction of an aggravating relay node (RN) causing downlink (DL) interference at a client node in a wireless-enabled communications environment implemented in accordance with an embodiment of the disclosure. As shown in FIG. 14, evolved Node B (eNB) '1' 802 is the serving cell for client node 'a' 808, with a corresponding coverage area for cell '1' 812, which is in the center of the coverage areas of cells '2' 814, '3' 1320, '4' 1430, '5' 1432, '6' 1434, and '7' 1436. As likewise shown in FIG. 14, eNB '2' 804 and eNB '3' 1310 respectively correspond to coverage areas for cells '2' 814 and '3' 1320. Likewise, RN '1' 806 and RN '3' 1424 reside within the coverage areas corresponding to cell '2' 814 and RN '2' 1422 resides within the coverage area corresponding to cell '3' 1320.

In this embodiment, aggravating RNs causing downlink (DL) interference for client nodes in neighboring cells are identified by client node 'a' 808 first providing a Reference Signal Received Power (RSRP) measurement report to its serving cell, eNB '1' 802. In turn, eNB '1' 802 uses the RSRP measurement report to determine that client node 'a' 808 is located at the intersection of cells '1' 812, '2' 814 and '3' 1320 and its neighboring cells are cells '2' 814 and '3' 1320. It will be appreciated that eNB '1' 802 would typically receive event-triggered RSRP measurement reports from client node 'a' 808 when it is proximate to the edge of a cell. If no RSRP measurement reports are received, then eNB '1' 802 could signal client node 'a' 808 to provide one. Alternatively, a post Rel-10 client node could automatically send a RSRP measurement report to the serving eNB (e.g., eNB '1' 802) whenever client node 'a' 808 sends a hidden node indicator.

Once the neighboring cells and the general location of client node 'a' 808 had been determined, the network identifies any aggravating RNs. If the network does not have the location information of the RNs deployed in the system, then it considers all RNs in the neighboring cells as aggravators. However, if the network does have RN location information, then it will consider the RNs around the victim client node (e.g., client node 'a' 808) aggravators. For example, as shown in FIG. 14, RNs '1' 806 and '2' 1422, which are located in the intersection region of Cells '1' 812, '2' 814, and '3' 1320 are considered aggravators.

In one embodiment, the victim client node (e.g., client node 'a' 808) provides additional location information, such as that provided by a Global Positioning System (GPS), to more accurately identify aggravating RNs. In other embodiments, the location of the victim client node is obtained via the implementation of approaches such as Observed Time Difference of Arrival (OTDOA) or Uplink Time Difference of Arrival (UTDOA). Likewise, for operator-deployed Type II RNs, the RN locations are pre-configured and may be stored in a network server. Accordingly, a victim client node's serving eNB could query the server to identify aggravating RNs.

In various embodiments, a Type II RN does not have a unique Cell ID. In these and other embodiments, an alternative node ID is used to facilitate communication with neighboring cells of the victim client node to assist in interference coordination. For example, the victim client node's serving eNB could pass the node IDs of aggravating RNs to the neighboring cells. Alternatively, the victim client node's serving eNB could pass the victim client node's location information to the neighboring cells, which could then use it to determine which RNs are aggravators.

In various embodiments, a RN observes significant UL interference from client nodes in neighboring cells if it cannot decode packets on UL, observes a high interference-over-thermal noise (IoT), or both. In these and other embodiments, hidden node issues on UL are determined by examining the IoT level at the RN. To do so, the RN calculates IoT for each subframe, denoted as $IoT_i$, i=1, ..., N during an observation window of N subframes. Then, the number of subframes with $IoT_i$−$IoT_0$>T is counted, where $IoT_0$ is the desired IoT level at RN. Assume that there are K subframes that IoT is higher than $IoT_0$ by T. If $K>T_f*N$ then it implies that a nearby client node is causing significant inter-cell interference and the RN is the victim.

As described in greater detail herein, $T_f$ represents the interference severity for declaring the hidden node issue. To prevent the RN seeing interference from client nodes within 'x' km from the RN we can set $T=P_{UE}*PL(x)/N_0$ (all the terms in linear scale), where $P_{UE}$ is the maximum UE transmitting power, PL(x) is the path loss at distance x km, and $N_0$ is the thermal noise power over the system bandwidth. The parameters T, $T_f$, and $IoT_0$ could be pre-configured at RN or passed to the RN from the eNB via upper layer signaling. Sub-band IoT can also be used to identify victim RNs. If some of the sub-band IoT values are significantly higher than the others, it could indicate that client nodes in neighboring cells are causing significant inter-cell interference on UL and that the RN is the victim.

In various embodiments, a victim RN encounters unexpected UL inter-cell interference from aggravating client nodes in neighboring cells. To identify the aggravating client nodes, the victim RN first notifies its serving eNB that it is encountering inter-cell interference. If the serving eNB knows the location of the victim RN, then it may be able to determine its neighboring cells. The serving eNB may also determine the victim RN's neighboring cells from its RSRP measurement report. Once determined, the serving eNB then notifies the neighboring cells. In turn, the neighboring cells may consider cell-edge client nodes that are close to the victim RN as aggravators. For example, referring to FIG. 14, assume that RN '1' 806 is a victim RN. Accordingly, eNB '2' 804 determines that Cell '1' 812 and '3' 1320 are the neighboring cells of RN '1' 806. Once the neighboring cells have been determined, eNB '2' 804 notifies eNB '1' 802 and eNB '3' 1310. Accordingly, from the RSRP measurement reports provided by client nodes eNB '1' 802 and eNB '3' 1310 may classify cell-edge client nodes (e.g., client node 'a' 808) that are close to Cell '2' 814 as aggravators.

In one embodiment, the serving eNB (e.g., eNB '2' 804) provides the Sounding Reference Signal (SRS) configurations of the cell-edge client nodes (e.g., client node 'a' 808) in neighboring cells (e.g., cell '1' 812) to the victim RN (e.g., RN '1' 806) to more accurately identify aggravating client nodes. If the RN observes strong SRSs, then it implies that there are client nodes in neighboring cells that are very close to the victim RN and causing significant interference. Likewise, the identity of the aggravating client nodes can be determined by the RN examining their corresponding SRS sequences.

Once the network has identified victims and aggravators, interference coordination can be applied to mitigate the interference or to avoid it altogether. In various embodiments, DL transmissions to victim client nodes and DL transmissions from aggravating RNs are coordinated to solve DL interference issues. Conversely, UL transmissions from aggravating UEs and UL transmissions to victim RNs are coordinated to solve UL interference issues. In these various embodiments, coordinated transmissions are achieved in either frequency domain, time domain, or frequency-time domain.

Figure 15A:
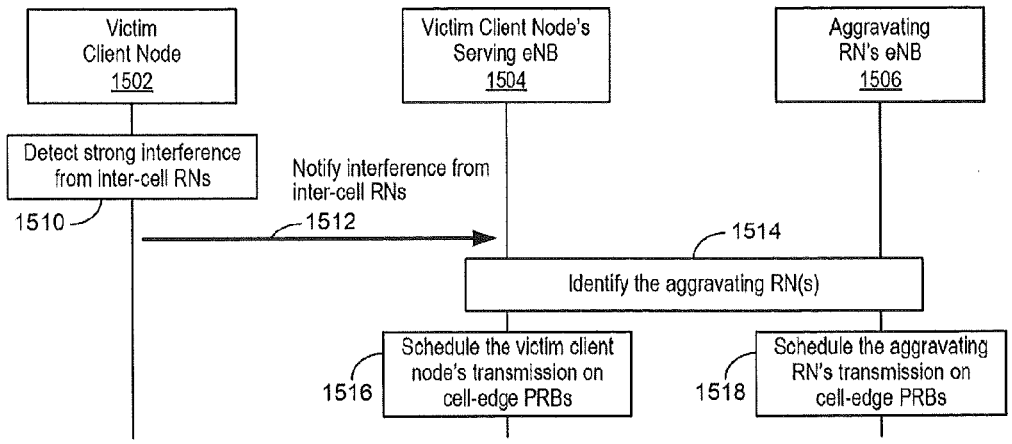
FIGS. 15*a-b* are simplified process signal flow diagrams illustrating the implementation of frequency domain interference coordination to avoid hidden node DL interference at a client node in a wireless-enabled communications environment.
Figure 15B:
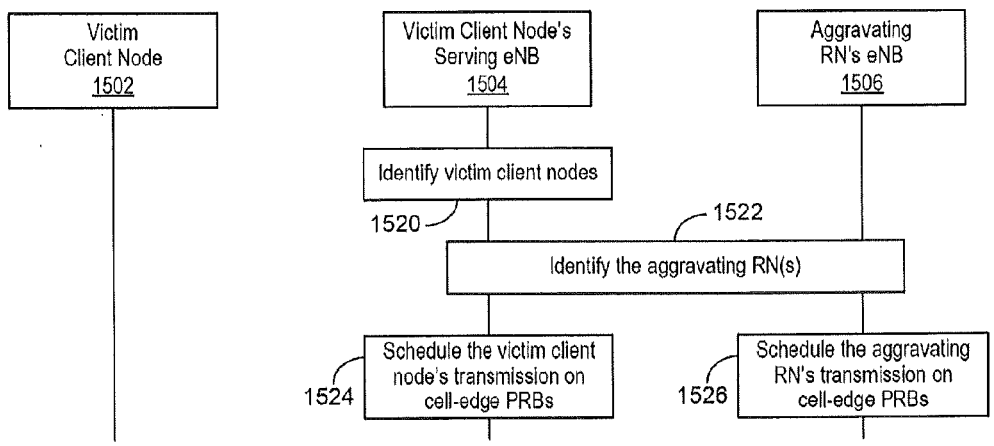

FIGS. 15a-b are simplified process signal flow diagrams illustrating the implementation of frequency domain interference coordination to avoid hidden node downlink (DL) interference at a client node in a wireless-enabled communications environment implemented in accordance with various embodiments of the disclosure. In various embodiments, transmissions between victims and aggravators occupy different Physical Resource Blocks (PRBs) to avoid interference. In these and other embodiments, Rel-8 Inter-cell Interference Coordination (ICIC) can be used to facilitate the coordinated transmissions. For example, as shown in FIG. 14, eNB '1' 802 schedules DL transmission to the victim client node (e.g., client node 'a' 808) to the PRBs that are reserved for cell-edge transmissions in cell '1' 812, while eNB '2' 804 and eNB '3' 1424 will respectively make DL transmissions from aggravating RNs '1' 806 and '2' 1422 on the cell-edge PRBs in cell '2' 814 and '3' 1320. Likewise, UL transmissions from the aggravating client node (e.g., client node 'a' 808) and UL transmissions to the victim RNs (e.g., RNs '1' 806 and '2' 1422) are respectively scheduled to the cell-edge PRBs in the associated cell.

In one embodiment, as shown in FIG. 15a, a victim client node 1502 detects strong interference from relay nodes (RNs) in neighboring cells in step 1510. In step 1512, the victim client node 1502 notifies its serving evolved Node B (eNB) 1504 that it has encountered interference from the inter-cell RNs. The serving eNB 1504 then communicates with the aggravating RN's eNB 1506 in step 1514 to identify the aggravating RNs as described in greater detail herein. Once the aggravating RNs have been identified, the serving eNB 1504 schedules the victim client node's 1502 transmission on cell-edge Physical Resource Blocks (PRBs) corresponding to the serving eNB 1504 in step 1516. Concurrently, the aggravating RN's eNB 1506 schedules the aggravating RN's transmission on cell-edge PRBs corresponding to the RN's eNB 1506 in step 1518.

In another embodiment, as shown in FIG. 15b, the victim client node's serving eNB 1504 identifies victim client nodes by its own (e.g., victim client node 1502) in step 1520. The serving eNB 1504 then communicates with the aggravating RN's donor eNB 1506 in step 1522 to identify the aggravating RNs as described in greater detail herein. Once the aggravating RNs have been identified, the serving eNB 1504 schedules the victim client node's transmission on cell-edge PRBs corresponding to the serving eNB 1504 in step 1524. Concurrently, the aggravating RN's eNB 1506 schedules the aggravating RN's transmission on cell-edge PRBs corresponding to the RN's donor eNB 1506 in step 1526.

Skilled practitioners of the art will recognize that it is possible that only the victims need to be identified, and not the aggravators, to simplify network operation. More specifically, all RNs in the system may be considered as aggravators on DL transmissions. Accordingly, DL transmissions to victim client nodes and DL transmissions from all RNs can be scheduled to the cell-edge PRBs of the corresponding cell to avoid interference with ICIC. However, it will likewise be recognized that the simplicity of not identifying aggravators may be at the cost of posing scheduling constraints to more RNs than necessary. Alternatively if there are a large number of victim client nodes in the system, then the network may operate in the mode described above and simply leave the aggravators unidentified instead of identifying aggravating RNs for each victim client node. Likewise, if there are only a few victim client nodes, then the aggravating RNs will be identified and scheduling constraints will be applied to them. The network needs to determine the mode to operate. In another example, if the network is aware that significant number of hidden RNs may potentially exist then a pre-configured operation may be simply chosen.

Figure 16:
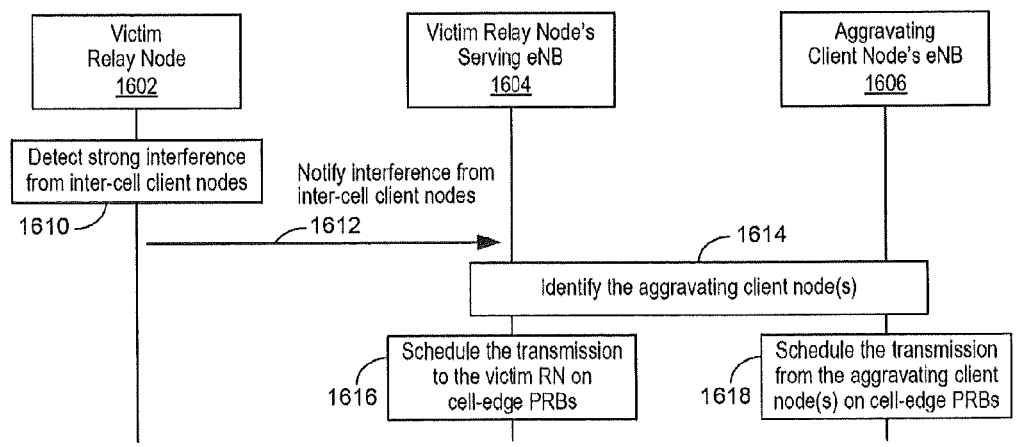
FIG. 16 is simplified process signal flow diagrams illustrating the implementation of frequency domain interference coordination to avoid UL interference at a relay node from a client node in a wireless-enabled communications environment.

FIG. 16 is simplified process signal flow diagrams illustrating the implementation of frequency domain interference coordination to avoid hidden node uplink (UL) interference in a wireless-enabled communications environment as implemented in accordance with an embodiment of the disclosure. In this embodiment, a victim relay node (RN) 1602 detects strong interference from inter-cell client nodes in step 1610. In step 1612, the victim RN 1602 notifies its serving evolved Node B (eNB) 1604 that it has encountered interference from the inter-cell client nodes. The serving eNB 1604 then communicates with the aggravating client node's eNB 1606 in step 1614 to identify the aggravating client nodes as described in greater detail herein. Once the aggravating client nodes have been identified, the serving eNB 1604 schedules transmission to the victim RN on cell-edge Physical Resource Blocks (PRBs) corresponding to the serving eNB 1604 in step 1616. Concurrently, the aggravating client node's eNB 1606 schedules the transmission from the aggravating client node(s) on cell-edge PRBs corresponding to the aggravating client node's eNB 1606 in step 1618.

Figure 17A:
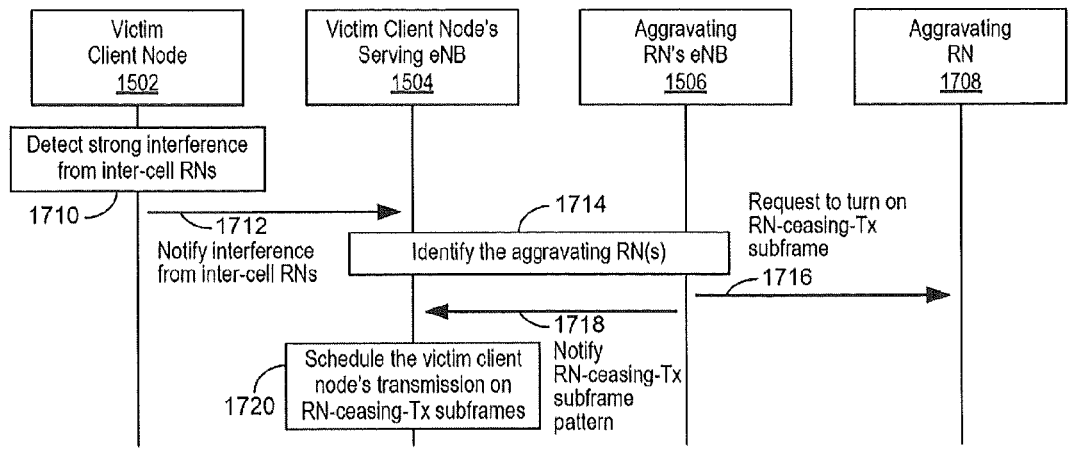
FIGS. 17*a-b* are simplified process signal flow diagrams illustrating the implementation of time domain interference coordination to avoid hidden node DL interference at a client node in a wireless-enabled communications environment.
Figure 17B:
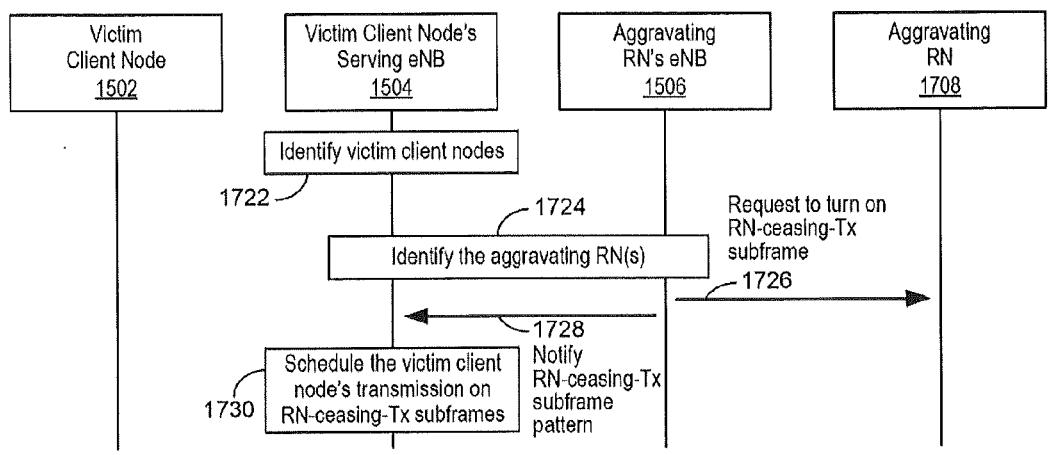

FIGS. 17*a-b* are simplified process signal flow diagrams illustrating the implementation of time domain interference coordination to avoid hidden node downlink (DL) interference at a client node in a wireless-enabled communications environment implemented in accordance with various embodiments of the disclosure. In various embodiments, on access link, the relay node (RN) ceases downlink (DL) transmissions on predetermined subframes, refrains from receiving on certain subframes on uplink (UL) receptions, or both, to facilitate interference coordination. In these and other embodiments, RN-ceasing-Transmit (Tx) subframes and RN-ceasing-Receive (Rx) subframes are coordinated according to a Hybrid Automatic Repeat Request (HARQ) timeline such that the ACK/NACK corresponding to a DL transmission will not fall into the RN-ceasing-Rx subframes. As used herein, RN-ceasing-Tx and RN-ceasing-Rx subframes refer to RN transmission and reception status on access link.

In one embodiment, a half-duplex RN listens to the eNB on a backhaul link during the RN-ceasing-Tx sub frames and transmits to the eNB on backhaul link during the RN-ceasing-Rx subframes. If the DL packet (re)transmission of a RN-served client node occurs during the RN-ceasing-Tx subframe, then the RN will not assist with (re)transmission of the data. Conversely, if the UL packet initial transmission of a RN-served client node occurs during a RN-ceasing-Rx subframe, then the RN will not be able to decode the packet and hence not assist the client node with data retransmission.

In various embodiments, to avoid interference, the DL transmission to the victim client node is scheduled to predetermined subframes that the aggravating RN has ceased transmission on access link. Likewise, on UL, the transmission from the aggravating client node is scheduled to the subframes that the victim RN refrains from receiving on access link. In one embodiment, the RN transmission/reception patterns are dynamically turned on and off at the aggravating and victim RNs. For example, to avoid hidden node interference on DL, the aggravating RN's eNB will request that the aggravating RN turn on RN-ceasing-Tx subframe on access link after receiving the message from the victim client node's serving eNB. In another embodiment, the aggravating RN's eNB sends a bitmap to the victim client node's eNB to indicate the RN-ceasing-Tx subframe pattern. In this embodiment, the system pre-configures M patterns and $\log_2 M$ bits sufficiently to reduce signaling overhead when indicating a pattern.

In these and other embodiments, the client node's serving eNB notifies the aggravating RN's eNB and the RN turns off the RN-ceasing-Tx subframe when the client node becomes free of hidden node interference and if no other client nodes are being affected by the RN. Likewise, the victim RN turns on the RN-ceasing-Rx subframe and lets neighboring cells know the RN-ceasing-Rx subframe pattern such that the neighboring cells can accordingly schedule the aggravating client nodes to avoid the hidden interference on UL. Once the victim RN is free of the interference from client node in neighboring cells, the RN can then turn off the RN-ceasing-Rx subframe.

It will be appreciated, for simplicity of network operation, that all RNs in a cell could employ the same transmission/reception pattern on access link such that there is no need to identify the aggravating RN on the DL. More specifically, it may only be necessary to identify the cell that the aggravating RN is associated with. Likewise, same transmission/receiving pattern can be applied to RNs that are in a cluster (e.g., a cluster of RNs deployed to cover a building or a campus). Once the serving cell detects a victim client node, the eNB schedules the client node on a subframe that is a RN-ceasing-TX subframe in the neighboring cell. On the UL, the eNB attempts to schedule cell-edge client nodes to transmit on a RN-ceasing-RX subframe to avoid potential interference to hidden RNs. It will likewise be appreciated that all RNs in the system that belong to different donor eNBs could use the same transmission/receiving pattern if network synchronization is enabled. Accordingly, the serving cell could carefully schedule cell-edge client nodes based on this system-wide RN transmission/receiving pattern, which would facilitate system-wide interference coordination in the time domain and reduce the occurrence of hidden node interference.

In various embodiments, hidden node interference may occur frequently when a large number of cell-edge client nodes and a large number of RNs are deployed close to cell edges. In these embodiments, the system-wide transmission/reception pattern is applied to all RNs in the system. Alternatively, the system-wide transmission/reception pattern is applied to just the RNs that are deployed close to cell edges. In these embodiments, the required signaling to communicate the RN transmission/reception pattern is significantly reduced and there is no need to identify the aggravating RNs. In another example, the necessity to turn on/off the transmission/reception pattern can be triggered by the observed HARQ terminations or Packet Error Rates. If for example, some eNBs has observed higher than normal HARQ terminations or PER for their UEs, this set of eNBs could turn on the transmission/reception patterns of their RNs (including their neighboring eNBs) to void the hidden node interferences. However, if hidden node interference issue does not occur frequently in the system, then it is preferable to identify the aggravating RNs and apply the transmission/reception pattern. Accordingly, the client node can make use of RN-ceasing-Tx subframes and estimate the nominal interference level on a data region without the RN transmitting.

In one embodiment, as shown in FIG. 17a, a victim client node 1502 detects strong interference from relay nodes (RNs) in neighboring cells in step 1710. In step 1712, the victim client node 1502 notifies its serving evolved Node B (eNB) 1504 that it has encountered interference from the inter-cell RNs. The serving eNB 1504 then communicates with the aggravating RN's eNB 1506 in step 1714 to identify the aggravating RNs as described in greater detail herein. Once the aggravating RNs have been identified, the aggravating RN's eNB 1506 requests the aggravating RN 1708 to turn on RN-ceasing-Tx subframes in step 1716. The aggravating RN's eNB 1506 then notifies the victim client node's eNB 1504 of the RN-ceasing-Tx subframe pattern in step 1718. In response, the serving eNB 1504 schedules the victim client node's 1502 transmission on RN-ceasing-Tx subframes corresponding to the aggravating RN 1708 in step 1720.

In another embodiment, as shown in FIG. 17b, the victim client node's serving eNB 1504 identifies victim client nodes (e.g., victim client node 1502) in step 1722. The serving eNB 1504 then communicates with the aggravating RN's eNB 1506 in step 1724 to identify the aggravating RNs as described in greater detail herein. Once the aggravating RNs have been identified, the aggravating RN's eNB 1506 requests the aggravating RN 1708 to turn on RN-ceasing-Tx subframes in step 1726. The aggravating RN's eNB 1506 then notifies the victim client node's eNB 1504 of the RN-ceasing-Tx subframe pattern in step 1728. In response, the serving eNB 1504 schedules the victim client node's 1502 transmission on RN-ceasing-Tx subframes corresponding to the aggravating RN 1708 in step 1730.

Figure 18:
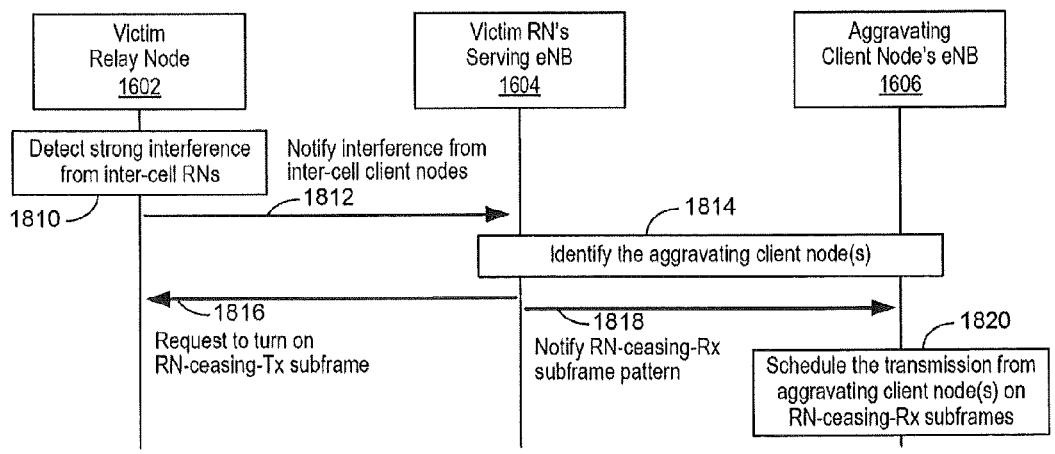
FIG. 18 is simplified process signal flow diagrams illustrating the implementation of time domain interference coordination to avoid UL interference at a relay node from a client node in a wireless-enabled communications environment.

FIG. 18 is simplified process signal flow diagrams illustrating the implementation of time domain interference coordination to avoid hidden node uplink (UL) interference in a wireless-enabled communications environment implemented in accordance with an embodiment of the disclosure. In this embodiment, a victim relay node (RN) 1602 detects strong interference from inter-cell client nodes in step 1810. In step 1812, the victim RN 1602 notifies its serving evolved Node B (eNB) 1604 that it has encountered interference from inter-cell client nodes. The victim RN's serving eNB 1604 then communicates with the aggravating client node's eNB 1606 in step 1814 to identify the aggravating client nodes as described in greater detail herein. Once the aggravating client nodes have been identified, the victim RN's serving eNB 1604 requests the victim RN 1602 turn on RN-ceasing-Rx subframes in step 1816, followed by notifying the aggravating client node's eNB 1606 of the RN-ceasing-Rx subframe pattern in step 1818. The aggravating client node's eNB 1606 then schedules transmission from the aggravating client node(s) on RN-ceasing-Rx subframes corresponding to the victim RN 1604 in step 1820.

Although the described exemplary embodiments disclosed herein are described with reference to managing hidden node interference, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A client node, comprising:
   a processing device configured to:
   establish communication with a first access node;
   detect interference with said communication, said interference generated by transmissions from a hidden relay node (RN), wherein said hidden relay node is served by a second access node;
   generate a set of interference data associated with said interference;
   provide said set of interference data to said first access node, wherein said first access node processes said set of interference data to generate transmission scheduling instructions, such that wireless communication is facilitated;
   receive a first set of the transmission scheduling instructions from said first access node; and
   use said first set of scheduling instructions to resolve said interference.

2. The client node of claim 1, wherein:
   said first set of scheduling instructions comprises scheduling said client node's transmission on cell-edge Physical Resource Blocks (PRBs) corresponding to said first access node,
   wherein said second access node is configured to provide a second set of scheduling instructions to said hidden relay node, said second set of scheduling instructions generated by said second access node and comprising scheduling said hidden relay node's transmission on said cell-edge PRBs corresponding to said second access node.

3. The client node of claim 1, wherein:
   said second access node provides a request to said hidden relay node to turn on RN-ceasing-Transmission (Tx) subframes;
   said second access node provides a RN-ceasing-Tx subframe pattern to said first access node, said RN-ceasing-Tx subframe pattern corresponding to subframes in which said relay node ceases transmission; and
   said first set of scheduling instructions comprises scheduling said client node's transmission on RN-ceasing-Tx subframes corresponding to said RN-ceasing-Tx subframe pattern.

4. The client node of claim 1, wherein said interference is experienced during a downlink (DL) transmission from said first access node to said client node.

5. The client node of claim 1, wherein said interference is experienced during an uplink (UL) transmission from said client node to said first access node.

6. A method for managing hidden node interference, comprising:
using a client node to:
establish communication with a first access node;
detect interference with said communication, said interference generated by transmissions from a hidden relay node (RN), wherein said hidden relay node is served by a second access node;
generate a set of interference data associated with said interference;
provide said set of interference data to said first access node, wherein said first access node processes said set of interference data to generate transmission scheduling instructions, such that wireless communication is facilitated;
receive a first set of the transmission scheduling instructions from said first access node; and
use said first set of scheduling instructions to resolve said interference.

7. The method of claim 6, wherein:
said first set of scheduling instructions comprise scheduling said client node's transmission on cell-edge Physical Resource Blocks (PRBs) corresponding to said first access node; and
said second access node a second set of scheduling instructions to said hidden relay node, said second set of scheduling instructions generated by said second access node and comprising scheduling said hidden relay node's transmission on said cell-edge PRBs corresponding to said second access node.

8. The method of claim 6, wherein:
said second access node provides a request to said hidden relay node to turn on RN-ceasing-Transmission (Tx) subframes;
said second access node provides a RN-ceasing-Tx subframe pattern to said first access node, said RN-ceasing-Tx subframe pattern corresponding to subframes in which said relay node ceases transmission; and
said first set of scheduling instructions comprise scheduling said client node's transmission on RN-ceasing-Tx subframes corresponding to said RN-ceasing-Tx subframe pattern.

9. The method of claim 6, wherein said interference is experienced during a downlink (DL) transmission from said first access node to said client node.

10. The method of claim 6, wherein said interference is experienced during an uplink (UL) transmission from said client node to said first access node.

11. A hidden relay node, comprising:
a processing device configured to:
establish communication with a first client node, wherein said hidden relay node is served by a first access node;
detect interference with said communication, said interference generated by transmissions from a second client node, wherein said second client node is served by a second access node;
generate a set of interference data associated with said interference;
provide said set of interference data to said first access node, to enable said first access node to process said set of interference data to generate scheduling instructions, such that wireless communication is facilitated;
receive a first set of said scheduling instructions from said first access node; and
use said first set of scheduling instructions to resolve said interference.

12. The hidden relay node of claim 11, wherein:
said first set of scheduling instructions comprise scheduling said hidden relay node's transmission on cell-edge Physical Resource Blocks (PRBs) corresponding to said first access node; and
wherein said second access node is configured to provide a second set of scheduling instructions to said second client node, said second set of scheduling instructions generated by said second access node and comprising scheduling said second client node's transmission on said cell-edge PRBs corresponding to said second access node.

13. The hidden relay node of claim 11, wherein:
said hidden relay node receives a request from said first access node to turn on RN-ceasing-Reception (Rx) subframes;
wherein said first access node is configured to provide a RN-ceasing-Rx subframe pattern to said second access node, said RN-ceasing-Rx subframe pattern corresponding to subframes in which said hidden relay node ceases reception; and
said first set of scheduling instructions comprise scheduling transmissions from said second client node on RN-ceasing-Rx subframes corresponding to said RN-ceasing-Rx subframe pattern.

14. The hidden relay node of claim 11, wherein said interference is experienced during a downlink (DL) transmission from said hidden relay node to said client node.

15. The hidden relay node of claim 11, wherein said interference is experienced during an uplink (UL) transmission from said first client node to said hidden relay node.

16. A method for managing hidden node interference, comprising:
using a hidden relay node to:
establish communication with a first client node, wherein said hidden relay node is served by a first access node;
detect interference with said communication, said interference generated by transmissions from a second client node, wherein said second client node is served by a second access node;
generate a set of interference data associated with said interference;
provide said set of interference data to said first access node to enable said first access node to process said set of interference data to generate scheduling instructions, such that wireless communication is facilitated;
receive a first set of said scheduling instructions from said first access node; and
use said first set of transmission scheduling instructions to resolve said interference.

17. The method of claim 16, wherein:
said first set of scheduling instructions comprise scheduling said hidden relay node's transmission on cell-edge Physical Resource Blocks (PRBs) corresponding to said first access node; and
said second access node provides a second set of scheduling instructions to said second client node, said second set of scheduling instructions generated by said second access node and comprising scheduling said second client node's transmission on said cell-edge PRBs corresponding to said second access node.

18. The method of claim 16, wherein:
said hidden relay node receives a request from said first access node to turn on RN-ceasing-Reception (Rx) subframes;

said first access node provides a RN-ceasing-Rx subframe pattern to said second access node, said RN-ceasing-Rx subframe pattern corresponding to subframes in which said hidden relay node ceases reception; and said first set of scheduling instructions comprise scheduling transmissions from said second client node on RN-ceasing-Rx subframes corresponding to said RN-ceasing-Rx subframe pattern.

19. The method of claim 16, wherein said interference is experienced during a downlink (DL) transmission from said hidden relay node to said client node.

20. The method of claim 16, wherein said interference is experienced during an uplink (UL) transmission from said first client node to said hidden relay node.

* * * * *